United States Patent
Pandharipande et al.

(10) Patent No.: US 9,301,373 B2
(45) Date of Patent: Mar. 29, 2016

(54) CONTROL UNIT AND METHOD FOR LIGHTING CONTROL

(75) Inventors: Ashish Vijay Pandharipande, Eindhoven (NL); David Ricardo Caicedo Fernández, Eindhoven (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 0 days.

(21) Appl. No.: 14/233,784

(22) PCT Filed: Jul. 19, 2012

(86) PCT No.: PCT/IB2012/053689
§ 371 (c)(1),
(2), (4) Date: Jan. 20, 2014

(87) PCT Pub. No.: WO2013/014582
PCT Pub. Date: Jan. 31, 2013

(65) Prior Publication Data
US 2014/0159589 A1    Jun. 12, 2014

Related U.S. Application Data

(60) Provisional application No. 61/510,518, filed on Jul. 22, 2011.

(51) Int. Cl.
*H05B 37/02* (2006.01)
(52) U.S. Cl.
CPC .................................. *H05B 37/0227* (2013.01)
(58) Field of Classification Search
CPC ....... H05B 37/029; H05B 37/02; G01S 13/58
USPC .............. 315/155, 315, 291; 342/82, 22, 450, 342/107; 607/62
See application file for complete search history.

(56) References Cited

U.S. PATENT DOCUMENTS

| | | | |
|---|---|---|---|
| 2007/0038268 A1* | 2/2007 | Weinberg et al. | 607/62 |
| 2009/0030605 A1* | 1/2009 | Breed | 701/208 |
| 2011/0255749 A1* | 10/2011 | England et al. | 382/106 |
| 2012/0150294 A1* | 6/2012 | Weinberg et al. | 623/10 |
| 2012/0229322 A1* | 9/2012 | Mostov | 342/22 |
| 2013/0113660 A1* | 5/2013 | Tufvesson et al. | 342/450 |

FOREIGN PATENT DOCUMENTS

| | | |
|---|---|---|
| CA | 2671680 A1 | 1/2011 |
| FR | 2928809 A1 | 9/2009 |
| WO | 2005069698 A1 | 7/2005 |

(Continued)

OTHER PUBLICATIONS

P R Boyce et al, "Lighting quality and office work: two field simulation experiments", Lighting Research and Technology, Sep. 2006; vol. 38, 3: pp. 191-223.

*Primary Examiner* — Douglas W Owens
*Assistant Examiner* — Syed M Kaiser
(74) *Attorney, Agent, or Firm* — Meenakshy Chakravorty (57) ABSTRACT

A control unit (9) for controlling luminance in a space (3), wherein the control unit is configured to estimate a three-dimensional location of at least one target (8) as a function of time, and control the luminance in the space based on the estimated three-dimensional location of the at least one target.

13 Claims, 3 Drawing Sheets

(56) References Cited

FOREIGN PATENT DOCUMENTS

| WO | 2009004539 A1 | 1/2009 | | |
|----|---------------|--------|---|---|
| WO | WO 2009004539 A1 | * | 1/2009 | ............. H05B 37/02 |
| WO | 2010131212 A1 | 11/2010 | | |
| WO | WO 2010131212 A1 | * | 11/2010 | ............. H05B 37/02 |

* cited by examiner

CONTROL UNIT AND METHOD FOR LIGHTING CONTROL

FIELD OF THE INVENTION

The present invention relates to a control unit and a method for lighting control.

BACKGROUND OF THE INVENTION

The use of artificial lighting to achieve practical or aesthetic effects is continuously increasing. Both for indoor and outdoor settings, there are numerous examples of lighting systems including e.g. light bulbs, LEDs, and spot lights for offices, restaurants, museums, advertising boards, homes, shops, shop windows, and so on.

A suitable/convenient lighting, whether in an indoor or outdoor setting, is highly beneficial for a person present in that environment, as the lighting may e.g. contribute to his/her comfort, productivity, well-being, etc. Manual control of the light source may improve the lighting, e.g. in that a person may control the lighting in a room according to his/her preference. For example, the person may switch on the light upon arrival and switch off the light when leaving the room. However, manual control of the lighting may at the same time be undesired, inefficient and/or tedious. As an example, for the lighting e.g. in stores, it is advantageous that a lighting control unit is able to turn off or turn on light sources without the operation of the client. As another example, the avoidance of manual control of the lighting may especially be advantageous in some cases such as when there is a plurality of light sources, and the light sources are placed at different locations in a room. A manual operation to switch on or off each one of the plurality of lamps may in this case be inconvenient.

In the light of the above observations, there is an increasing need for automatic lighting systems which can provide a suitable lighting for the user.

In patent document WO-2005/069698, a lighting control related to the detection of occupants is disclosed. Light which is emitted in each local area is uniquely modulated to identify the respective area. The modulated light is detected by wearable occupancy detectors in the local areas, which in turn transmit detector-locator signals to lighting control units, thereby identifying which local areas are occupied. These signals may also uniquely identify the respective detectors, thereby enabling a lighting system controller to determine the number and identities of the detectors in each local area.

However, alternative and/or complementary solutions for lighting may be of interest, such that a more suitable lighting is provided.

SUMMARY OF THE INVENTION

It is an object of the present invention to mitigate the above problems and to provide a device and a method that provides an improved lighting.

This and other objects are achieved by providing a control unit and a method having the features defined in the independent claims. Preferred embodiments are defined in the dependent claims.

Hence, according to a first aspect of the present invention, there is provided a control unit for controlling luminance in a space. The control unit is configured to estimate a three-dimensional location of a target as a function of time. Furthermore, the control unit is configured to control the luminance in the space based on the estimated three-dimensional location of the target.

According to a second aspect of the present invention, there is provided a method for controlling luminance in a space. The method comprises the step of estimating a three-dimensional location of a target as a function of time. Furthermore, the method comprises the step of controlling the luminance in the space based on the three-dimensional location of the target.

Thus, the present invention is based on the idea of providing a control unit for estimating a three-dimensional (3D) location of target(s), and to control the luminance based on this estimated 3D location of the target(s). In other words, the luminance may be controlled dependent on the estimated 3D location of the target(s).

An advantage of the present invention is that the control unit provides a lighting which is more suitable/convenient for a target compared to the lighting obtained by other prior art systems. As the control unit of the present invention is able to estimate a 3D location of a target, the lighting function of a light source may be adapted dependent on the estimated 3D location of the target such that a more suitable/convenient lighting is provided in the space.

It will be appreciated that the inventors have realized that a control unit and a method may be provided to control luminance in a space with respect to a 3D location of a target as a function of time. The present invention is advantageous in that it conveniently provides a control/adaptation of the lighting dependent on the estimated 3D location of the target(s). In contrast, prior art systems, based on e.g. presence detection of a person in a room, may adjust the light only when presence of a person is sensed. However, these systems are inferior to the present invention, e.g. in that the systems do not set the light based on any knowledge of any position in three dimensions of the person or a portion of the person (target) as a function of time. The prior art systems are thereby related to numerous drawbacks, e.g. in that the lighting is not conveniently set for the target(s) and/or that the lighting is not energy efficient. Conversely, the control unit and the method of the present invention are highly advantageous in that they efficiently and conveniently control the luminance in the space based on an estimated 3D location of target(s) as a function of time.

As the 3D location of the target(s) is (are) estimated as a function of time, the present invention is further advantageous in that a vertical motion/movement of the target may be estimated. More specifically, a velocity and/or acceleration of the target may be estimated. Based on this information, the control of the luminance in the space may be even more improved.

It will be appreciated that the term "three-dimensional location" (3D) in this context may be construed as a spatial location, e.g. a location in a space defined by substantially any coordinate system, e.g. polar or Cartesian coordinates. Furthermore, it will be appreciated that the term "estimate" in this context may be construed as "measure", "determine", "predict", or any other similar term. For example, the control unit may comprise means for sensing (e.g. a sensor) a 3D location of a target.

According to an embodiment of the present invention, the control unit may further be configured to estimate the three-dimensional location based on an azimuth angle, an elevation angle, and a distance to the target. Hence, the 3D location of the target(s) may be based on polar coordinates and a distance to the target. The present embodiment is advantageous in that the control unit hereby may conveniently estimate the spatial/3D location of the targets(s) as a function of time.

According to an embodiment of the present invention, the control unit may further be configured to identify an activity of the target based on the estimate of the three-dimensional location and to control the luminance in the space based on the activity of the target. It will be appreciated that the terms "identify an activity" may be construed as a recognition of a pattern/scheme of the 3D location and/or 3D movement of the target(s) such that an activity of the target(s) may be identified. The present embodiment is advantageous in that the control unit firstly identifies an activity of the target (based on the 3D location(s) of the target(s) as a function of time), and secondly controls the luminance in accordance with this activity, such that the luminance is suitably/conveniently adapted to the kind of activity. Hence, the luminance offers improved visual conditions based on the activity the target is engaged in. For example, the control unit may be configured to identify a first activity based on one or more 3D locations/movements of one or more targets at a first period of time and/or at a first portion of the space, and control the luminance according to this activity. Analogously, a second activity of the target(s) may be identified at a second period of time and/or at a second portion of the space, etc., such that the control unit adapts the luminance accordingly.

The activity which may be identified by the control unit may substantially be any activity/action/exercise of the target(s). For example, if the target is a person, the activity may comprise standing, walking, running, jumping, sitting, cycling, etc. Furthermore, the control unit may identify an even more specific activity based on the 3D location of the target(s)/person(s), e.g. a sporting activity (e.g. football, volleyball, tennis, basketball, etc.) or an occupation (e.g. reading, writing, typing, talking, sewing, playing an instrument, etc.). Moreover, the control unit may be configured to identify any combination of activities for one or more targets, e.g. standing and reading, walking and then sitting, a sitting target (e.g. audience) seated in front of a standing target (e.g. actor), etc.

According to an embodiment of the present invention, the control unit may further be configured to identify the activity of the target based on a comparison of the estimate of the three-dimensional location with a three-dimensional location limit of the target. It will be appreciated that the term "limit" may be construed as a bound, border, threshold, or the like. Furthermore, two or more limits may provide an interval, region, bin, or the like. In other words, the "three-dimensional location limit" may be construed as a division/partition of the space, and serve as a limit and/or interval for an identification of the activity of the target. For example, the control unit may be configured to estimate a first 3D location of a target with respect to a first vertical or horizontal limit/interval, a second 3D location of a target with respect to a second vertical or horizontal limit/interval, etc. If the control unit estimates that a target(s) is/are present at a certain 3D location limit/interval or that a target moves to another 3D location/interval (e.g. in that a sensor signal exceeds a threshold), the control unit may identify the activity of the target(s) based on a comparison of the estimate of the 3D location with the 3D location(s) limits of the target(s). The present embodiment is advantageous in that the control unit may more precisely identify the activity of the target based on the comparison of the estimate of the 3D locations of target(s) with the 3D location limits/intervals. As a result, the control unit may provide an even more improved control of the luminance in the space.

According to an embodiment of the present invention, the control unit may further be configured to identify the activity of the target based on a comparison of the estimate of the three-dimensional location with a model representative of a specific activity. It will be appreciated that the term "model" may be construed as a typical pattern/scheme of the 3D location of a target as a function of time, corresponding to a specific activity. In other words, if the 3D location of one or more targets as a function of time corresponds to a typical 3D location of targets of a model of a specific activity, the control unit may identify the activity of the target as that specific activity. For example, if the 3D location of head(s), hand(s) and/or foot/feet corresponds to an activity of the target such as e.g. walking, sitting, playing football, etc., the control unit may identify this activity of the target.

According to an embodiment of the present invention, the control unit may further be configured to identify the target based on the estimate of the three-dimensional location. The present embodiment is advantageous in that the control unit may provide an enhanced understanding of what the target may be, and thereby to an even further extent improve the control of the luminance in the space. In other words, the control unit may recognize/identify a target based on its 3D location as a function of time. For example, a target which 3D location is estimated to be relatively close to the floor of the room, may for example be a foot/feet, leg(s), or the like. Analogously, a target which the control unit estimates to be at an intermediate 3D location may for example be hand(s) and/or a hand-held target (e.g. a tool, sports equipment, etc.). Moreover, the control unit may recognize/identify a target based on its movement, velocity and/or acceleration in a vertical direction. For example, a target which moves with a pendular movement may for example be identified as foot/feet, leg(s), hand(s) of a person walking. Thus, the present embodiment provides the advantage of contributing to the identification/recognition of the target(s), thereby further improving the control of the luminance in the space.

According to an embodiment of the present invention, the control unit may further be configured to estimate the three-dimensional location based on a return signal, wherein the return signal is generated by reflection of a probing signal that is reflected against the target. The present embodiment is advantageous in that the control unit may easily and conveniently estimate the 3D location on the probing and return signal, wherein the mentioned signals may be transmitted/received from the control unit itself or from a means for transmission/reception of signals, e.g. a transceiver and/or any sensing means comprising a transmitter/receiver.

According to an embodiment of the present invention, the control unit may further be configured to estimate the location of a static element based on the probing signal and the return signal. The present embodiment is advantageous in that the control unit may even further improve the estimation of one or more 3D locations of target(s) based on its configuration to locate a stationary element. In other words, the control unit may control the luminance in accordance with one or more 3D locations of targets, e.g. head, hands and/or feet of a person which moves, compared to a static/stationary element/object, e.g. a desk. The present embodiment is further advantageous in that the control unit may estimate the location of static element(s) such that an estimation of moving location(s) of target(s) may be infeasible wherein static elements are provided in the space (e.g. book shelves).

According to an embodiment of the present invention, the control unit is further configured to determine an elapsed time, a phase shift and a change in frequency based on the probing signal and/or the return signal. By "elapsed time", it is meant the time elapsed from the time when the probing signal is transmitted (e.g. from a transmitter) to the time when the return signal is received (e.g. by a plurality of receivers). Furthermore, by "phase shift" it is here meant the phase shift of the return signal, i.e. phase difference between the return signal for e.g. a plurality of receivers. Moreover, the velocity of the target(s) may be estimated by means of the shift in frequency on a received return signal from a probing signal, known as the Doppler effect. The present embodiment is advantageous in that the control unit may even more precisely determine the 3D location of the target(s), leading to an even more improved control of luminance in the space.

According to an embodiment of the present invention, the control unit may further be configured to estimate a horizontal range of the target as a function of time. It will be appreciated that the terms "horizontal range" may be construed as an interval, region, bin, or the like, in a horizontal direction of the space. For example, the "horizontal range" may be construed as a division/partition of the space in a horizontal direction. The present embodiment is advantageous in that the control unit may estimate a location/position of the target in a plane of the space, resulting in an even more improved control of the luminance in the space. Furthermore, by the estimation of the horizontal range of the target(s), the control unit may more precisely estimate the horizontal location(s)/position(s) of target(s), such that an even more improved control of the luminance in the space may be provided by the control unit. The present embodiment is even further advantageous in that an even more precise estimate of the 3D location of the target may be achieved, leading to an even further improved control of the luminance in the space. Furthermore, the more precise 3D-estimate even further contributes to the identification of the target, such that the present embodiment even further improves the control of the luminance in the space. Moreover, the more precise 3D-estimate of the target location may even further contribute to the identification of the activity of the target by the control unit, resulting in the ability of the control unit to even further control/adapt the luminance in the space.

According to an embodiment of the present invention, the control unit is further configured to estimate the velocity of the target such that a trajectory of the target is estimated as a function of time, and wherein the control unit is further configured to control the luminance in accordance with the trajectory. By the terms "estimate the velocity" it is here meant that the velocity may be estimated from the estimated location(s) of the target(s) as a function of time, e.g. by derivation. Moreover, by the term "trajectory", it is here meant e.g. a path, a route or a way for target(s) in one, two or three dimensions. The present embodiment is advantageous in that the control unit to an even higher extent is able to control/adapt the luminance in the space based on the estimated trajectory of the target(s). For example, from the estimated location and the velocity of the target(s), the control unit may estimate the location of the target(s) at a later time by integration. Based on this estimate on (future) target location(s), the control unit may even further control the luminance in the space. Moreover, the estimated trajectory/trajectories of target(s) may contribute to the identification of the activity of the target. For example, the control unit may, based on one or more trajectories of a target (e.g. hand, foot, head), identify e.g. standing, walking, running, jumping, sitting, cycling, etc., a sporting activity (e.g. football, volleyball, tennis, basketball, etc.), an occupation (e.g. reading, writing, typing, talking, sewing, playing an instrument, etc.), or any combination of the mentioned (or other) activities. Hence, the control unit may, by the present embodiment, even more conveniently control the luminance in the space.

The control unit may further be configured to control the luminance in the space based on a previously estimated trajectory of the target. This is advantageous, as the control unit may control the luminance in the space based on one or more trajectories estimated at one or several earlier time periods, thereby leading to an even more precise estimate of the trajectory of the target(s). Additionally, the trajectory of the target may be further improved based on a current estimate of location of the target. Furthermore, the velocity of the target may be estimated based on one or more previously predicted locations and/or velocities of the target. Furthermore, the control unit may even refrain from estimating contemporary trajectories, and control the luminance in the space based on a previously estimated trajectory of the target(s).

According to an embodiment of the present invention, the target is part of an object and the control unit is further configured to control the luminance based on the object. In other words, the target(s) may constitute portion(s) of an object. For example, the object may be a human body, and the one or more targets may be extremities of the human body, e.g. hands, feet, head. The present invention is advantageous in that the control of luminance may be improved if the control is based on an object comprising targets. For example, the control unit may control the luminance based on a walking person, wherein the targets of the person may be feet, hands and/or head. Moreover, the 3D location of the mentioned targets may be estimated for a person (object) walking and then sitting, a person running, etc. The control unit may thereby control the lighting based on the object, wherein the 3D location(s) of the target(s) are estimated, which even further improves the control of the luminance in the space.

The control unit may further comprise means for receiving information relative to the space and be configured to control the luminance based on the information. The information relative to the space may be obtained in situ, e.g. information relating to the shape of the space itself and/or furniture arranged in the space. Alternatively, the information may be obtained in advance relative to the space (e.g. drawings, designs and/or plans). This advantageous, as the information even further improves the control of the luminance in the space, e.g. in that the information may contribute to the estimation of 3D locations of the targets. For example, the information may indicate what the space is (e.g. sports hall, theatre, music hall, etc.) which further ameliorates the control of the luminance. For example, a sports hall may indicate many estimations of 3D locations of targets (e.g. hands, feet, heads, arms and/or equipment such as e.g. balls), whereas in a theatre, the control unit may be configured to control the lighting based on persons walking to their respective places, sitting during the play, and then walking out of the theatre. A further advantage provided by the information relative to the space (compared to any previously provided information of the space) is that the information may comprise possible changes in the space (e.g. refurnishing). This is beneficial, as the control of luminance in the space may be based on information regarding the present structure/appearance of the space. Furthermore, the correlation may be based on information on how the structure of the space and/or the furniture cast shadows in the space. Information relative to the space may be obtained by means for transmitting and receiving signals, e.g. a sensor and a receiver. Alternatively, the means may be any picture recording system (e.g. a camera or film camera) for receiving information relative to the space.

According to an embodiment of the present invention, there is provided a lighting control system for controlling a lighting function of a light source. The lighting control system comprises at least one transmitter for transmitting at least one probing signal within a transmitting range and a plurality of receivers for receiving a return signal, wherein the return signal is a part of the probing signal that is reflected against a target present within the transmitting range. A control unit is in communication with the plurality of receivers to estimate the three-dimensional location of the target as a function of time. The present embodiment is advantageous in that the lighting control system conveniently and efficiently transmits/receives signals, which thereafter are used by the control unit for estimating the three-dimensional location of the target as a function of time.

It will be appreciated that the specific embodiments and any additional features described above with reference to the control unit are likewise applicable and combinable with the method according to the second aspect of the present invention.

BRIEF DESCRIPTION OF THE DRAWINGS

These and other aspects of the present invention will now be described in more detail, with reference to the appended drawings showing a currently preferred embodiment of the invention, wherein.

DETAILED DESCRIPTION OF THE EMBODIMENTS

In the following description, the present invention is described with reference to a control unit controlling luminance in a space and a lighting control system for controlling a lighting function of a light source.

Figure 1:
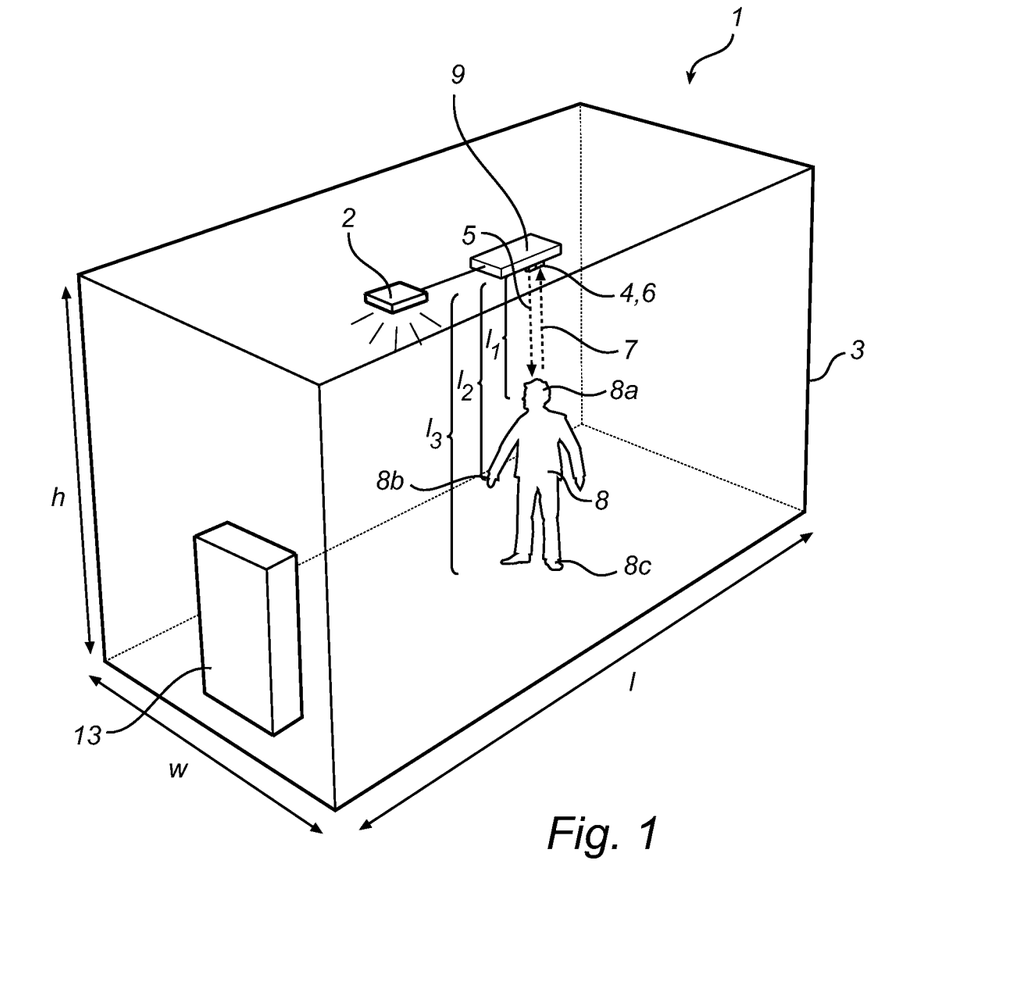
FIG. 1 is a schematic illustration of a lighting control system according to an embodiment of the present invention.

FIG. 1 is a schematic illustration of a lighting control system 1 for controlling a lighting function of an illumination device 2. Here, the space 3 is exemplified as a room 3 with length 1, width w and height h, and the illumination device 2 is shown as a single light source 2 positioned in the ceiling of the room 3. However, it will be appreciated that the illumination device 2 may comprise a plurality of light sources 2 which further may be distributed within the space/room 3.

A control unit 9 is arranged in the space 3 for controlling the luminance, wherein the control unit 9 is further configured to estimate a three-dimensional (3D) location ($l_{1-3}$) of the respective targets 8a-c (in the following, the 3D locations will be indicated in the figures as vertical levels/distances for an increased understanding of the figures. Thus, it will be appreciated that the 3D locations of targets, depicted in one dimension, may further include elevation and/or azimuth angles for determining the 3D locations of the targets). In FIG. 1, the 3D locations $l_{1-3}$ are estimated from the ceiling of the room 3. Furthermore, the targets 8a-c are depicted as the head 8a, the hands 8b and the feet 8c of a person walking in the space 3. However, it will be appreciated that any kind of element, portion, body part, etc., may fall within the meaning of the word "target".

The estimate of the 3D locations $l_{1-3}$ of the respective targets 8a-c may be performed as follows: in the ceiling of the room 3 is positioned one or more transmitters 4 for transmitting a probing signal 5 within a transmitting range. Close to the transmitter 4 is positioned a plurality of receivers 6, wherein the transmitter 4 and the plurality of receivers 6 may be separated. Alternatively, the transmitter 4 and the plurality of receivers 6 may be integrated in one single transmitter/receiver arrangement. Furthermore, it will be appreciated that the transmitter/receiver arrangement may be provided substantially anywhere in the space 3.

The probing signal 5 may be reflected against one of more of the targets 8a-c present within the transmitting range, thereby resulting in one or more return signals 7. From this, a distance from the transmitter/receiver to the target may be estimated by the control unit 9. Furthermore, the control unit 9 may determine the azimuth and elevation angles to the target, such that a 3D location of the target is estimated. The probing signal 5, transmitted by the transmitter 4, may be a series of pulsed sinusoids. Ultrasound may be an example of sensor modality, although the principles outlined may be extensible to other modalities like RF.

In the exemplifying embodiment of FIG. 1, the control unit 9 is in communication with the plurality of receivers 6, and is configured to estimate the 3D locations $l_{1-3}$ of the targets 8a-c within the space 3, based on the at least one return signal 7. In a specific embodiment, the control unit 9 may determine an elapsed time, a phase shift and/or a change in frequency based on the probing signal 5 and/or the return signal(s) 7.

However, it will be appreciated that the estimation of the 3D locations $l_{1-3}$ of the targets 8a-c may be performed in substantially any other way.

Furthermore, in the exemplifying embodiment, the control unit 9 is in communication with the light source 2 for controlling the luminance in the space 3 based on the estimated 3D locations $l_{1-3}$ of the targets 8a-c. For example, the control unit 9 may control the illumination in the space 3 based on the 3D location $l_1$ of the head 8a, the 3D location $l_2$ of the hands 8b and/or the 3D location $l_3$ of the feet 8c as a function of time of the target 8. For example, if the target 8 jumps, the targets 8a-c may decrease their respective 3D location $l_{1-3}$, and the control unit 9 may control the light source 2 accordingly.

The control unit 9 may be configured to identify the targets 8a-c based on the estimate of their 3D locations $l_{1-3}$. For example, the control unit may identify the target 8a to be a head 8a if the 3D location $l_1$ is relatively close to the ceiling of the space 3 (e.g. by a relatively short distance between the target and the ceiling) and/or that the identification is based on the movement of the 3D location $l_1$ as a function of time (e.g. according to a pattern/criteria for the target 8a). Analogously, the control unit 9 may identify the target 8b to be hands 8b, if the 3D location $l_2$ is at an intermediate height (and/or that the target 8b discloses a pendular movement), and/or that the target 8c is one or more feet 8c, if the 3D location $l_3$ is relatively close to the floor of the space 3 (i.e. a relatively long distance between the target and the ceiling) and/or that the target 8c discloses a pendular movement. The control of the luminance (light source 2) based on the estimated 3D location(s) $l_{1-3}$ of the target(s) 8a-c is highly beneficial, as a convenient luminance may be provided in the space 3, wherein the control is based on movement(s) and/or stationary behavior(s) as a function of time of the target(s) 8a-c.

In FIG. 1, a static element 13 is provided, exemplified as a cupboard 13. The control unit 9 is further configured to estimate the location of one or more static elements 13 based on the probing signal 5 and on the return signal 7. Hence, the control unit 9 is configured to distinguish the cupboard 13 (or any other static element 13 in the space 3) from the target 8. The estimation of location of the static element 13 may comprise a so called time-of-flight processing based on the return signal 7 that ultimately result in (almost) zero contribution when a difference in time is evaluated between consecutive signals. Alternatively, estimations of locations of static elements 13 may be performed in a manual configuration step.

Figure 2A:
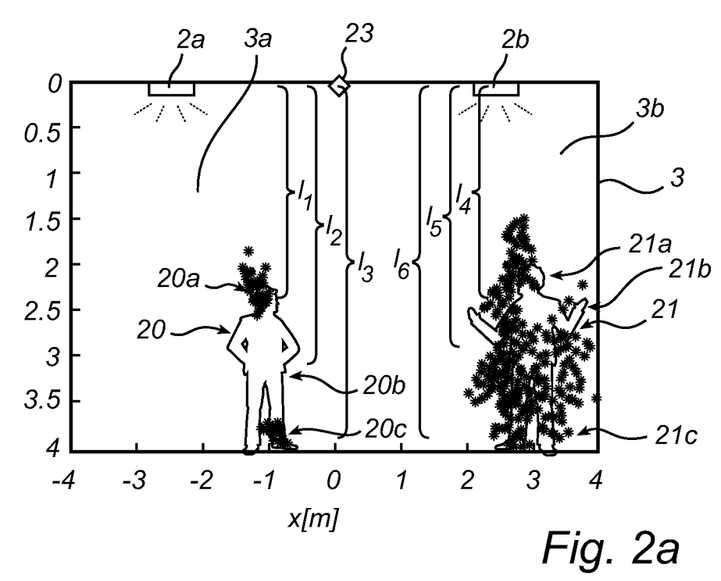
FIGS. 2a-c are schematic views of a control unit in a space according to an embodiment of the present invention.

FIG. 2a schematically shows a side view of a space/room 3. A first object (person) 20 and a second object 21 (person) are present in the room 3, wherein the objects 20 and 21 are separated in a horizontal direction x. As a numerical example, object 20 is located/positioned at x=−1 m, whereas object 21 is located/positioned at x=3 m. 3D locations $l_{1-3}$ of targets 20a-c of the first object 20 and 3D locations $l_{4-6}$ of targets 21a-c of a second object 21 are indicated as asterisks as function of time, wherein the respective targets in this example are heads (a), hands (b) and feet (c). As a numerical example, the heads 20a, 21a and feet 20c, 21c of objects 20, 21 are located/positioned at levels $l_1=l_4=2.3$ m and $l_3=l_6=3.8$ m. A transmitter/receiver arrangement 23 (sensor) is provided in the ceiling of the room 3 for 3D location detection of the respective targets 20a-c and 21a-c.

As shown in FIG. 2a, the 3D locations $l_{1-3}$ of targets 20a-c of the first object 20 do not vary significantly with time. In other words, the 3D locations $l_{1-3}$ remain, e.g. within small ranges in a vertical direction. The control unit 9 of the present invention (not shown in FIG. 2a) is configured to control the light source 2a in a subspace 3a of the space 3, based on the estimated 3D locations $l_{1-3}$ of the targets 20a-c. Hence, in this example, the control unit 9 controls the luminance according to a small/limited movement of the targets 20a-c. For example, the light source 2a may be dimmed in the subspace 3a of object 20, or be set/controlled such that the luminance is at least not as bright as compared to a possible situation of high movement of targets 20a-c.

The control unit 9 may further be configured to identify an activity of the first object 20 based on the estimate of the 3D locations $l_{1-3}$ of the object 20 and to control the luminance in the subspace 3a of the space 3 based on this activity. In the present example, wherein the 3D locations $l_{1-3}$ of the targets 20a-c remain within small ranges in a vertical direction (i.e. the head 20a, the hands 20b and the feet 20c of the first object 20 remain relatively still), the control unit 9 may identify that the activity of the first object 20 is "standing". Furthermore, the control unit 9 may identify the activity of the first object 20 based on any relationship between respective 3D locations (e.g. the 3D location difference $l_1-l_2$ compared to the 3D location difference $l_2-l_3$).

Analogously with the above example for the first object 20, the 3D locations $l_{4-6}$ of the targets 21a-c of the second object 21 are further estimated by the control unit 9. As shown in FIG. 2, the 3D locations $l_{4-6}$ of targets 21a-c of the second object 20 vary with time, i.e. the 3D locations $l_{4-6}$ vary in a vertical direction. The control unit 9 of the present invention may, in a subspace 3b of the space 3 close to the object 21, control a light source 2b according to a relatively high movement of one or more of the targets 20a-c. For example, the luminance may be controlled to a bright luminance in the subspace 3b of the object 21, or at least brighter compared to a situation of relatively low movements of the targets 21a-c.

Furthermore, the control unit 9 may identify the activity of the second object 21 to be "speaking" based on the estimate of the 3D locations $l_{4-6}$ and to control the light source 2b (i.e. the luminance in the subspace 3b of the space 3) based on this activity. More specifically, in the present example, the control unit 9 may estimate that object 21 is "speaking" based on a relatively varying 3D location $l_2$ of the hands 21b (animated gestures while speaking), whereas the 3D location $l_4$ of the head 21a and 3D location $l_6$ of the feet 21c do not vary to the same extent.

Hence, for the exemplifying embodiment of the present invention in FIG. 2a, the control unit 9 may control the luminance e.g. such that a more intense/bright light is set in a subspace 3b of the object 21 ("speaker"), whereas a more dimmed light is set in a subspace 3a of the object 20 ("stander").

It will be appreciated that the embodiment of the present invention as shown in FIG. 2a of "standing" and "speaking" is purely exemplifying, and that any movement/activity of targets/objects are feasible. Furthermore, it is understood that any model/criteria/function for the control unit 9 for estimating 3D locations/movements (and activities) of targets are possible.

Figure 2B:
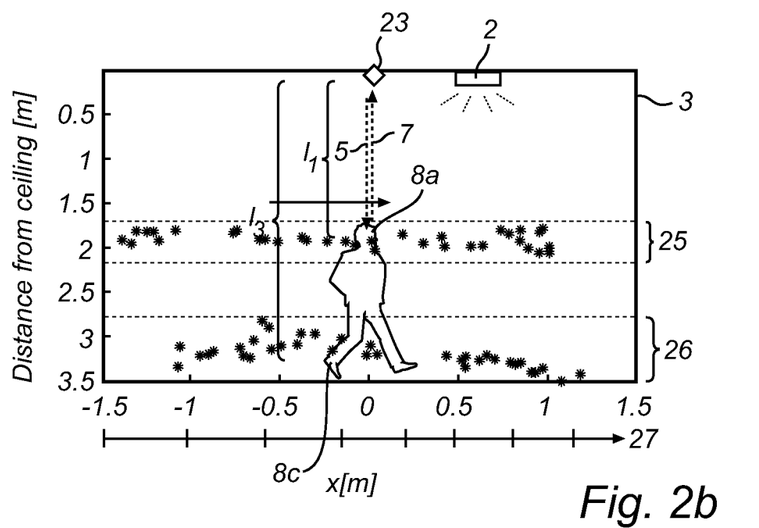

FIG. 2b schematically shows a side view of a space/room 3. A first three-dimensional location limit 25 (shown in FIG. 2b in one dimension for an enhanced understanding) is defined by two horizontal, parallel lines approximately in the middle of the space 3, at approximately 2 m from the ceiling. Analogously, a second 3D location limit 26 is indicated defined by a horizontal line and the floor of the space 3, at approximately 3 m from the ceiling. The control unit 9 (not shown in FIG. 2b) may be configured to estimate the 3D location limit/interval 25 and/or the 3D location limit/interval 26 based on a threshold for the return signal 7. The control unit 9 may identify an activity of the targets based on a comparison of the 3D location $l_3$ of a target 8c (e.g. a foot) and/or of the 3D location $l_1$ of a target 8a (e.g. a head) with the 3D location limits 25, 26. In FIG. 2b, wherein the 3D locations $l_1$ and $l_3$ as a function of time of the targets 8a and 8c are indicated as asterisks, the targets 8a and 8c remain within the ranges 25 and 26, respectively, as a function of time. The targets 8a and 8c are estimated to be present in a 3D location limit 25 and 26, respectively, if the signal power of the return signal 7 exceeds a detection threshold, wherein the threshold may be chosen depending on (adapted to) ambient noise conditions.

Furthermore, the control unit 9 is further configured to estimate a horizontal range 27 of the targets 8a and 8c as a function of time, wherein a horizontal range is defined by two parallel, vertical lines along a horizontal axis. The horizontal range 27 of the targets 8a and 8c may be determined by angles in a plane parallel to the ceiling of the space 3, e.g. by determining the azimuth and elevation angles. The determination may be performed by so called direction-of-arrival (DoA) algorithms. Details about DoA may be found e.g. in E. Tuncer and B. Friedlander (2009) Classical and modern direction-of-arrival estimation, ISBN-13: 978-0-12-374524-8, and such details are incorporated herein by reference.

Hence, the control unit 9 is configured to estimate the 3D location limits 25 and 26 of the 3D locations $l_1$ and $l_3$ of the targets 8a and 8c in FIG. 2b, and furthermore configured to estimate the horizontal range 27 of the targets 8a and 8c, as a function of time. Here, the targets 8a and 8c remain within the 3D location limits/intervals 25 and 26, while the horizontal range 27 (angular positions) changes with time, as indicated by the asterisks. Moreover, the control unit 9 may estimate that the 3D location $l_1$ of target 8a is at an intermediate range of the space 3 (i.e. at a relatively short distance from the ceiling of the space 3), whereas the 3D location $l_3$ of target 8c is at range close to the floor of the space 3 (i.e. at a relatively long distance from the ceiling of the space 3). Based on this information, the control unit 9 may be configured to identify this activity as "walking" (in FIG. 2b indicated as a person walking from left to right in the space 3), and the control unit 9 may control a light source 2 in the space 3 based on this activity. Furthermore, the control unit may identify the targets 8a and 8c based on the estimates of the 3D locations $l_1$ and/or $l_3$, e.g. as head 8a and foot/feet 8c of a target 8 (person), which even further improves the identification of a target 8 activity. To further refine the identification process of the control unit 9, one or more human walking models may be used for an improved profiling of the activities.

It will be appreciated that the estimated activity of "walking" as shown in FIG. 2b is purely exemplifying, and that substantially any movement/activity of targets/objects 8 are feasible. For example, if one or more targets 8a-c do not vary substantially with time, the control unit 9 may identify the activity of the target 8 as "standing". If the 3D locations of hands 8b of a target 8 vary, whereas targets 8a (e.g. head) and 8c (e.g. feet) do not vary, the activity may be identified as "standing in discussion mode". Moreover, "walking"+"sitting", may be identified by the control unit 9 by the aforementioned identification of "walking", followed by an identification of "sitting", e.g. wherein the 3D location $l_1$ (e.g. by the distance from the ceiling) of the head 8a increases and/or there is a smaller difference between the 3D locations of the head 8a and the feet 8c. Furthermore, "sitting"+"typing/reading" may be identified by the control unit 9 by the aforementioned identification of "walking", followed by an identification of "sitting", e.g. wherein the 3D location of the hands 8b vary, whereas the head 8a and the feet 8c of the target 8 remain substantially still.

Figure 2C:
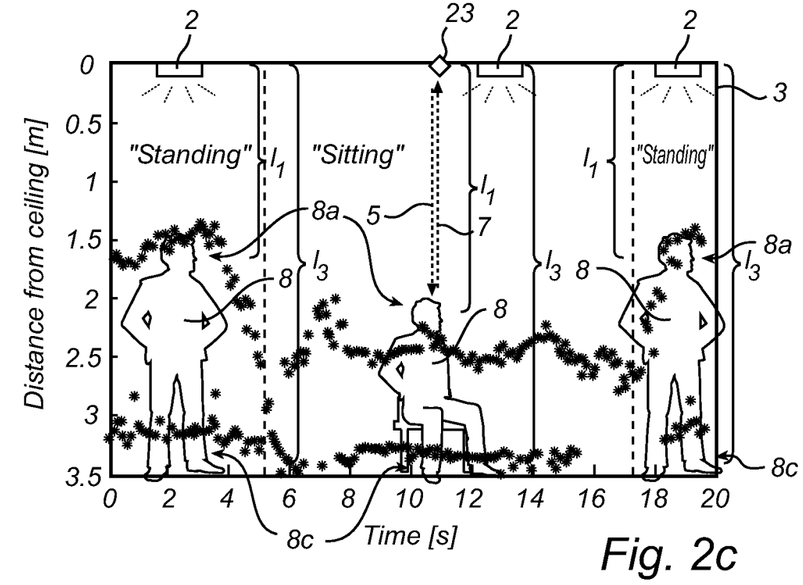

FIG. 2c schematically shows a side view of a space/room 3, wherein the y-axis indicates the distance from the ceiling and the x-axis indicates time. To the left of FIG. 2c, i.e. at an initial time, 3D locations $l_1$ and $l_3$ of target 8a (e.g. a head) and target 8c (e.g. foot/feet) of an object 8 are estimated, approximately at $l_1$=1.5 m and $l_3$=3.2 m. The control unit 9 (not shown in FIG. 2c) controls a light source 2 in the space 3 based on the 3D locations $l_1$ and $l_3$ of targets 8a and 8c, respectively. In this example, the control unit 9 may control the luminance according to a small/limited movement of the targets 8a, 8c as a function of time. Furthermore, the control unit 9 may further be configured to identify the activity of the object 8 based on the estimate of the 3D locations $l_1$, $l_3$ and to control the luminance in space 3 based on this activity. In the present example, wherein the 3D locations $l_1$, $l_3$ of the targets 8a, 8c remain within small ranges in a vertical direction as a function of time, the control unit 9 may identify that the activity of the object 8 is "standing".

After approximately five seconds, the control unit 9 estimates that the 3D location $l_1$ (distance from ceiling) increases to approximately 2.5 m, whereas 3D location $l_3$ increases to approximately 3.3 m. The control unit 9 controls the light source 2 based on $l_1$ and/or $l_3$, i.e. in that the luminance is set to a brighter light (alternatively a less bright light) compared to the "standing" activity to the left in FIG. 2c. Furthermore, the control unit 9 may further be configured to identify the activity of the object 8 as "sitting", based e.g. on the estimate of the 3D locations $l_1$, $l_3$, and to control the luminance in space 3 accordingly. After approximately fifteen seconds, the control unit 9 estimates that the 3D location $l_1$ (distance from ceiling) decreases to approximately 1.5 m and $l_3$ to 3.2 m of the object 8. The control unit 9 may estimate that the activity of the object 8 is "standing", and control the luminance accordingly.

Figure 3:
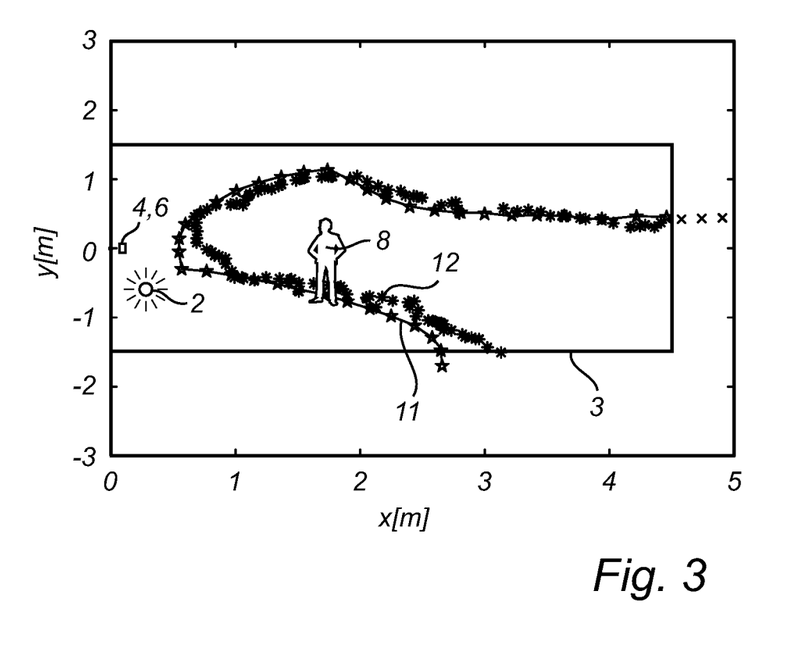
FIG. 3 is a view of a trajectory of a target according to an embodiment of the present invention.

FIG. 3 is a view of a trajectory 11 of a target/object 8 in a room 3 which is approximately 4.5 m long and 3 m wide. The one of more transmitters 4 and the plurality of receivers 6 are located on the middle of the wall at the left hand side of the room 3. Close to the plurality of receivers 6 is provided a light source 2.

As shown by the trajectory 11 marked by a number of stars, the target 8, depicted as a person, enters the room 3 from approximately the middle of the long side of the room 3, or, expressed in coordinates of FIG. 3, from x=2.8, y=−1.4. The person then turns left and walks to the left side of the room 3 towards the short end of the room 3, at x=0.5, y=0. From there, the target 8 turns right and walks along the long side of the room 3 opposite the long side from which the person entered the room 3. The target 8 then exits the room 3 at x=4.5, y=0.5, at the right side of the room 3.

The control unit 9 (not shown in FIG. 3) may estimate the velocity of the target 8 such that a trajectory 11 of the target 8 is estimated as a function of time, and control the luminance (the light source 2) in accordance with the trajectory 11. An estimated trajectory 12, shown as a number of asterisks, is estimated by the control unit 9. As shown, the estimated trajectory 12 closely follows the real trajectory 11 of the target 8 in the room 3. Thus, the control unit 9 may accurately estimate/predict the trajectory 11 of the target 8, and control the luminance in the space 3 in accordance with the trajectory 11. It will be appreciated that the trajectory 11, although depicted in a plane of the space 3, is possible to be estimated in one, two, or three dimensions. The estimated trajectory/trajectories 11 of the target 8 may contribute to the identification of the activity of the target 8. It will be appreciated that even though the target 8 is shown as a person, the target 8 may be e.g. a head, hand(s) and foot/feet, such that their trajectories 11 are estimated.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

For example, the control unit 9 may be provided outside the room 3 and/or have a wireless communication with the plurality of receivers 6 and light source 2.

Furthermore, the trajectory 11, and the respective estimated trajectory 12 of the target 8 are shown in FIG. 3 as an example, and any other trajectories within the room 3 may be feasible.

The invention claimed is:

1. A control unit for controlling luminance in a space comprising:
    at least one receiver in communication with the control unit,
    at least one transmitter in communication with the control unit,
    at least one illumination device in communication with the control unit, the illumination unit having light output controlled by the control unit,
    the control unit being configured to:
    using the at least one receiver and at least one transmitter mounted in the space, estimate, based upon signals received by the at least one receiver, a velocity of the at least one target such that a trajectory of the at least one target is estimated as a function of time,
    identify an activity of the at least one target based on a comparison by the control unit of the trajectory with a model representative of a specific activity, and
    control the luminance in the space by the control unit controlling the light output of the at least one illumination device based on the identified activity of the at least one target.

2. The control unit as claimed in claim 1, further being configured to estimate the velocity or trajectory based on an azimuth angle, an elevation angle, and a distance to the at least one target.

3. The control unit as claimed in claim 1 further being configured to identify the activity of the at least one target based on a comparison of the velocity or trajectory with at least one three-dimensional location limit of the target.

4. The control unit as claimed in claim 1 further being configured to identify the at least one target based on the estimate of the trajectory.

5. The control unit as claimed in claim 4, further being configured to estimate the velocity or trajectory based on at least one return signal, wherein the return signal is generated by reflection of at least one probing signal that is reflected against the at least one target.

6. The control unit as claimed in claim 5, further being configured to estimate a location of at least one static element based on the at least one probing signal and the at least one return signal.

7. The lighting control system as claimed in claim 5, wherein the control unit is further configured to determine an elapsed time, a phase shift and a change in frequency based on the at least one probing signal and/or the at least one return signal.

8. The control unit as claimed in claim 7, further being configured to estimate a horizontal range of the at least one target as a function of time.

9. The control unit as claimed in claim 1, wherein the at least one target is part of an object and wherein the control unit is further configured to control the luminance based on the at least one object.

10. The control unit as claimed in claim 9, wherein the object is a human body and the at least one target is an extremity of the human body.

11. A lighting control system for controlling a lighting function of at least one light source, comprising
   the at least one transmitter for transmitting at least one probing signal within a transmitting range,
   a plurality of receivers for receiving at least one return signal, the at least one return signal being a part of the at least one probing signal that is reflected against a target present within the transmitting range, wherein the plurality of receivers includes the at least one receiver, and
   a control unit as claimed in claim 10, the control unit being in communication with the plurality of receivers to estimate the three-dimensional location of the at least one target as a function of time.

12. A method for controlling luminance in a space, comprising the steps of:
   estimating a velocity of at least one target such that a trajectory of the at least one target is estimated as a function of time,
   identifying an activity of the at least one target based on a comparison of the trajectory with a model representative of a specific activity, and
   controlling the luminance in the space based on the identified activity of the at least one target.

13. A control unit for controlling luminance in a space comprising:
   at least one receiver in communication with the control unit,
   at least one transmitter in communication with the control unit,
   at least one illumination device in communication with the control unit, the illumination unit having light output controlled by the control unit,
   the control unit being operable to:
   estimate a three-dimensional location of at least one target as a function of time,
   identify an activity based upon signals received by the at least one receiver of the at least one target based on a comparison by the control unit of the estimated three-dimensional location with a model representative of a specific activity,
   control the luminance in the space by the control unit controlling the light output of the at least one illumination device based on the identified activity of the at least one target and/or the estimated three-dimensional location,
   identify the at least one target based on the estimate of the three-dimensional location,
   estimate the three-dimensional location based on at least one return signal, wherein the return signal is generated by reflection of at least one probing signal that is a reflected signal,
   determine at least one of an elapsed time, a phase shift and a change in frequency based on the at least one probing signal and/or the at least one return signal, and
   estimate the velocity of the at least one target such that a trajectory of the at least one target is estimated as a function of time, and wherein the control unit is further configured to control the luminance in accordance with the trajectory.

* * * * *